United States Patent [19]
Schiffel et al.

[11] Patent Number: 5,774,460
[45] Date of Patent: Jun. 30, 1998

[54] LOCAL ISDN RADIO TRANSMISSION SYSTEM

[75] Inventors: Reinhard Schiffel; Klaus Jäckel; Bruno Stadler; Holger Vogel, all of Berlin, Germany

[73] Assignee: Krone Aktiengesellschaft, Berlin-Zehlendorf, Germany

[21] Appl. No.: 592,426

[22] PCT Filed: Jul. 28, 1994

[86] PCT No.: PCT/DE94/00878

§ 371 Date: Jul. 3, 1996

§ 102(e) Date: Jul. 3, 1996

[87] PCT Pub. No.: WO95/05053

PCT Pub. Date: Feb. 16, 1995

[30] Foreign Application Priority Data

Aug. 5, 1993 [DE] Germany .......................... 43 26 749.1

[51] Int. Cl.$^6$ .............................. H04Q 7/24; H04Q 7/30; H04Q 11/04

[52] U.S. Cl. .......................... 370/329; 370/524; 455/450; 455/517

[58] Field of Search ..................................... 370/315, 328, 370/329, 338, 313, 314, 465, 468, 524; 379/58, 59, 60, 63; 455/33.1, 53.1, 54.1, 54.2, 507, 569, 517, 403, 422, 426, 450

[56] References Cited

U.S. PATENT DOCUMENTS

| | | | |
|---|---|---|---|
| 5,325,419 | 6/1994 | Connolly et al. | 379/60 |
| 5,363,371 | 11/1994 | Roy et al. | 370/465 |
| 5,519,702 | 5/1996 | Takahashi | 370/468 |
| 5,542,094 | 7/1996 | Owada et al. | 455/54.1 |
| 5,608,780 | 3/1997 | Greszberg et al. | 379/58 |

*Primary Examiner*—Hassan Kizou
*Attorney, Agent, or Firm*—Sprung Kramer Schaefer & Briscoe

[57] ABSTRACT

A local ISDN transmission system has a central base station and a number of subscriber radio terminals greater than the number of communication channels. The system is connectable to subscriber ports through an $S_0$ wireless transmission interface and is responsive to an activation request from a subscriber radio terminal for opening any available and free communication channel for a communication. An intermediate generator in the base station and in each subscriber terminal divides an ISDN two-wire subscriber connection line between a line termination section and a network termination section communicating by radio transmission. The intermediate generator, upon the occurrence of an activation request by a subscriber terminal, allocates a communication channel within waiting and monitoring periods for the activation of the ISDN two-wire subscriber connecting line. A delay system delays the activation request by a delay period sufficient to switch the allocated communication channel and activate a radio system of the subscriber terminal.

13 Claims, 10 Drawing Sheets

STANDARD OPERATION FOR THE ACTIVATION OF THE UKO SECTION WITH INTERMEDIATE REGENERATOR, SHOWING THE IOM INTERFACE AND ACTIVATION BY LT

FIG. 6 MODIFIED OPERATION OF THE ACTIVATION OF THE $U_{K0}$ INTERFACE AND ACTIVATION BY LT

OPERATING DIAGRAM OF THE SUBSCRIBER STATION OF AN ISDN-DAL SYSTEM WITH DELAY IN THE IOM INTERFACE

FIG. 10

LOCAL ISDN RADIO TRANSMISSION SYSTEM

TECHNICAL FIELD

The invention relates to a local ISDN transmission system which is organized as a local radio cell, consisting of a central fixed radio station and a plurality of subscriber radio terminals and is connected to the subscriber ports (ISDN base connections) of a local switching center, store-and-forward center or private branch exchange, and provides subscribers with access to the public ISDN telephone system through an $N_0$ interface by the use of wireless transmission, and in which, for the operation of the system in the case of a number of subscribers greater than the number of the duplex radio channels (hereinafter called communication channels) in use, a radio communication system is present in a central fixed radio station (base station BS) which, in the event of an activation request (PH-ACTIVATE REQUEST), opens to the subscriber radio terminal (TL), by means of a special radio communication process, any one of the available and free communication channels for communication.

STATE OF THE ART

The invention relates to a local ISDN radio transmission system. It is organized as a local radio cell which consists of a central fixed radio station (BS base station) and a plurality of outside subscriber radio terminals. The object is to use wireless transmission in order to provide access to the public ISDN telephone network through an $S_0$ interface for subscribers who for a great variety of reasons cannot be connected to a communications system via standardized subscriber lines.

Multi-user systems for radio-supported connection of telephone subscribers to the public telephone network are in wide use. They come under mainly the following categories:
1. Mobile radio networks These are characterized mainly by roaming and handover (overload) facilities with all of the resultant consequences for the network control and the demand for the ability to use mobile equipment at high road speeds of up to 200 kn/h and the resultant demands placed on the radio transmission process.
2. Trunking networks These have roaming and handover like the mobile radio networks, but as regards subscriber spectrum, territorial extent, functionality and especially access to the public networks they are subject to the limitations referred to above.
3. Networks based on cordless telephone technology These networks are intended to break the connection of the cordless telephone to a specific main line and to extend the territorial range of use to the range of a PABX by inserting a handover.
4. DAL (wireless loop)

These are characterized by wireless connection of stationary subscribers in the case of a connection of the radio transmission system that is equal for all subscribers. This means that in the telecommunication system each radio subscriber has a subscriber line of its own, and the radio transmitter is inserted between these subscriber connections and the radio subscriber.
5. Rural networks These are characterized by the fact that, from a central node exchange or secondary exchange, they make a point-to-multipoint connection in territorially very remote areas, and radio connections are used. Channel groups are transmitted which can be split up into several planes en route and are sent to several end points. From these end points the subscribers are connected usually via cable, and if radio is used, equal-channel connection is usually performed. In the rural networks no switching functions are performed.

These systems offer the subscriber in general an a/b connection or adequate functions as regards speech communication and modem and fax transmission. To some extent, special connections are offered for data transmission (data terminals). The data rates can amount to up to 64 kbit/s. These systems are designed for connection to the ISDN and sometimes they provide a few select functions of the ISDN to the subscriber. The preparation of an unlimited $S_0$ interface, however, is not one of the performance features of this system.

So a process is described in PCT/EP91/00853 (International Publication Number WO91/18483) for offering GSM subscribers access to performance features of the ISDN. The process presented, however, is limited by the fact that the ISDN subscriber plane with 2B+D (2×64 kbit/s) cannot be transmitted 1:1 to the GSM subscriber plane with Bm|Dm (3 or 12 or 9.6 kbit/s) (see, FIG. 3 and page 1, lines 10 to 19).

So-called DAL (wireless subscriber line) systems are already widely in use and under the above-given premises they have proven their right to exist. The systems up to now, however, offer the radio subscriber only one subscriber line with an a/b interface. Examples are given in Mandel, Günter; Kercher, Klaus; "DAL in analog-zellularer Technik" Electronik, Berlin 42 (1992) 4 and Leipold, Peter: "DAL—Funktechnik im Teilnehmeranschlußbereich" NTZ 45 (1992) 4.

In Buckingham, Colin; Wolterink, Gé Klein, Akerberg, Dag; A Business Cordless PABX Telephone System on 800 $MH_z$, based on the DECT Technology, IEEE Communications Magazine, January 1991 a solution is described which is based on the DECT standard and by using a TDM/TDMA/TDD process permits the wireless connection of subscribers to PABX's or PSTN's. In the system a digital transmission at 32 kbit/s per channel is used, 8 channels being transmitted with an RF carrier, requiring a total gross data rate of 640 kbit/s. This system would be suitable if several channels were to be assigned to one subscriber for the processing of $S_0$ lines by the subscriber, but it has two basic consequences.
1. A TDMA frame with a duration of 16 ms is divided into 8 channel pulse frames for the direction from the base station to the subscriber terminal and 8 channel pulse frames for the direction from the subscriber terminal to the base station, resulting in a duration of 1 ms for the individual channel frames.

Thus, there are no reserves for propagation time compensation (different distances between the subscriber terminal and the base station), and the system is limited to very short distances of up to 300 meters.

For the quantification of these statements: The achievement of a service range of 30 km radius calls for intermissions of 0.2 ms between the transmissions of two successively transmitting subscriber terminals.
2. The transmission of 8 channels in duplex operation occupies a radiofrequency band width of 1 MHz, which is acceptable only at the minimum ranges and the low transmission powers of 80 mW which they entail.

BRIEF DESCRIPTION OF THE INVENTION

The invention described herein offers the radio subscriber a subscriber line with an $S_0$ interface in order to be able to use all of the power features of this modern communications technology. In addition to the premises set forth above which appear to make the use of radio transmission for subscribers practical, there is also the fact for the ISDN subscriber line that radio transmission overcomes distance limitations which arise due to attenuation problems in transmission over wires. Furthermore, limitations of distance due to transit time problems are overcome by radio transmission, since the $S_0$ interface is not used for radio transmission.

A concrete embodiment of the invention is described with reference to the ISDN two-wire subscriber line with a $U_{KO}$ interface. The principles of the solution, however, are valid for all other ISDN two-wire subscriber lines with U interfaces if it is adapted to the adequate signals used in them.

Details of the invention are further described with the aid of the circumstances represented in the drawings.

It is another important aim of the invention to provide for a high frequency economy of the radio transmission system. This requirement has a high priority since the net bit rate of the ISDN subscriber line, at (B1+B2+D)=144 kbit/s, no matter how the channel is formed, results in wide-band radio channels.

This requirement is met by making the number of radio channels substantially lower than the number of radio subscribers, and the ratio must be made variable in order to permit adaptation to different traffic levels according to the subscriber structure.

For this purpose a solution is used in which the ISDN two-wire subscriber line between line termination (LT) in the ISDN communication and network termination (NT) at the subscriber's is divided into two parts by the use of an intermediate generator (ZWR), and in the ZWR-NT part the wired transmission is replaced by radio transmission. The ZWR is a component of the base station (BS) of the local radio cell and the NT a component of the subscriber terminal (TL). Both are so made up that, when an activate request (PH ACTIVATE REQUEST) is present, the assignment of a communication channel is performed within the waiting and monitoring period for the activation of the ISDN two-wire subscriber line.

BEST WAYS OF EMBODYING THE INVENTION

Figure 1:
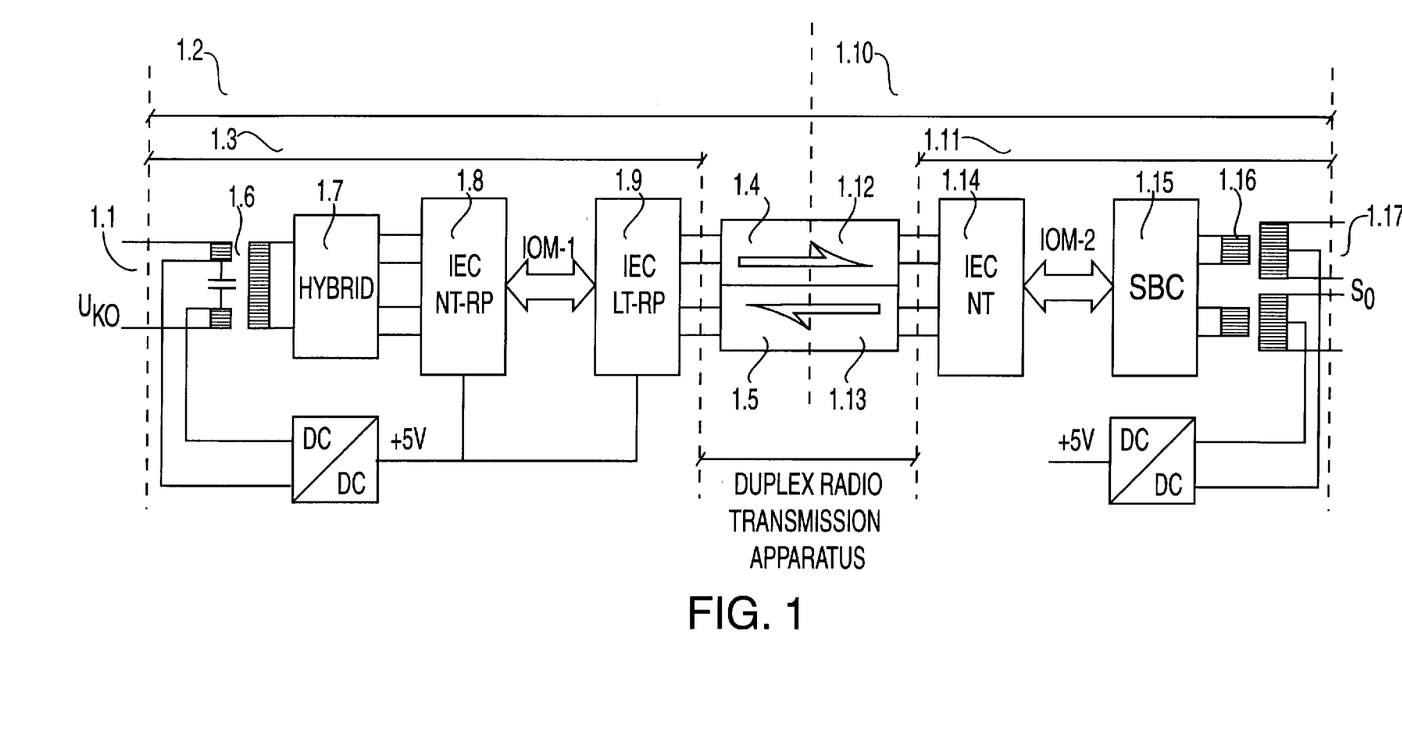
FIG. 1 shows the principle of the connection of ISDN subscribers by radio.

The schematic diagram of a connection made to a subscriber is contained in FIG. 1. The diagram abstracts from all sets of units which are not functionally involved in a radio connection.

The $U_{KO}$ subscriber connection 1.1 created by the ISDN-TVSt is made to a channel group of the base station 1.2, which consists of a $U_{KO}$ repeater (ZWR) 1.3 and the transmit group 1.4 and receive group 1.5. The $U_{KO}$ repeater is conventionally constructed with a $U_{KO}$ transmitter 1.6, hybrid 1.7, and two IEC-T circuits connected through an IOM interface. The coupling of the $U_{KO}$ repeater to the radio system is made to separate downstream and upstream lines, omitting the hybrid. The radio system can, if necessary, also contain groups for code conversion, insertion of redundancy for error detection and error correction, and cryptographic processing of the signal.

The subscriber radio terminal 1.10 (see FIG. 1) consists of the receiving group 1.12 and the transmitting group 1.13 which are coupled to separate downstream and upstream lines, omitting the hybrid, to a network termination (NT) 1.11. The NT is conventionally composed of an IEC-T circuit in the NT mode 1.14 and circuit SBC or SBCX 1.15, which are connected through an IOM interface, and an $S_0$ transformer 1.16. The subscriber radio terminal presents an $S_0$ interface 1.17 at its output.

A design of this kind can be wired only as a fixed line without additional measures, which would require a radio channel for each radio subscriber, but it had to be avoided as far as the aims are concerned. To achieve the established aim it is necessary to allocate a free radio channel for every call request (always referred to hereinafter as radio service switching). The communication internal to the system that is required for radio service switching between the channel component of the base system and the subscriber radio terminal, and the operation of subscriber switching units, transmitting and receiving units, etc., calls for a finite time which, according to the invention, has to be inserted into the wake-up procedure of the $U_{KO}$ circuit such that it is not thereby impaired and can be performed on-line after the wake-up procedure.

Figure 2:
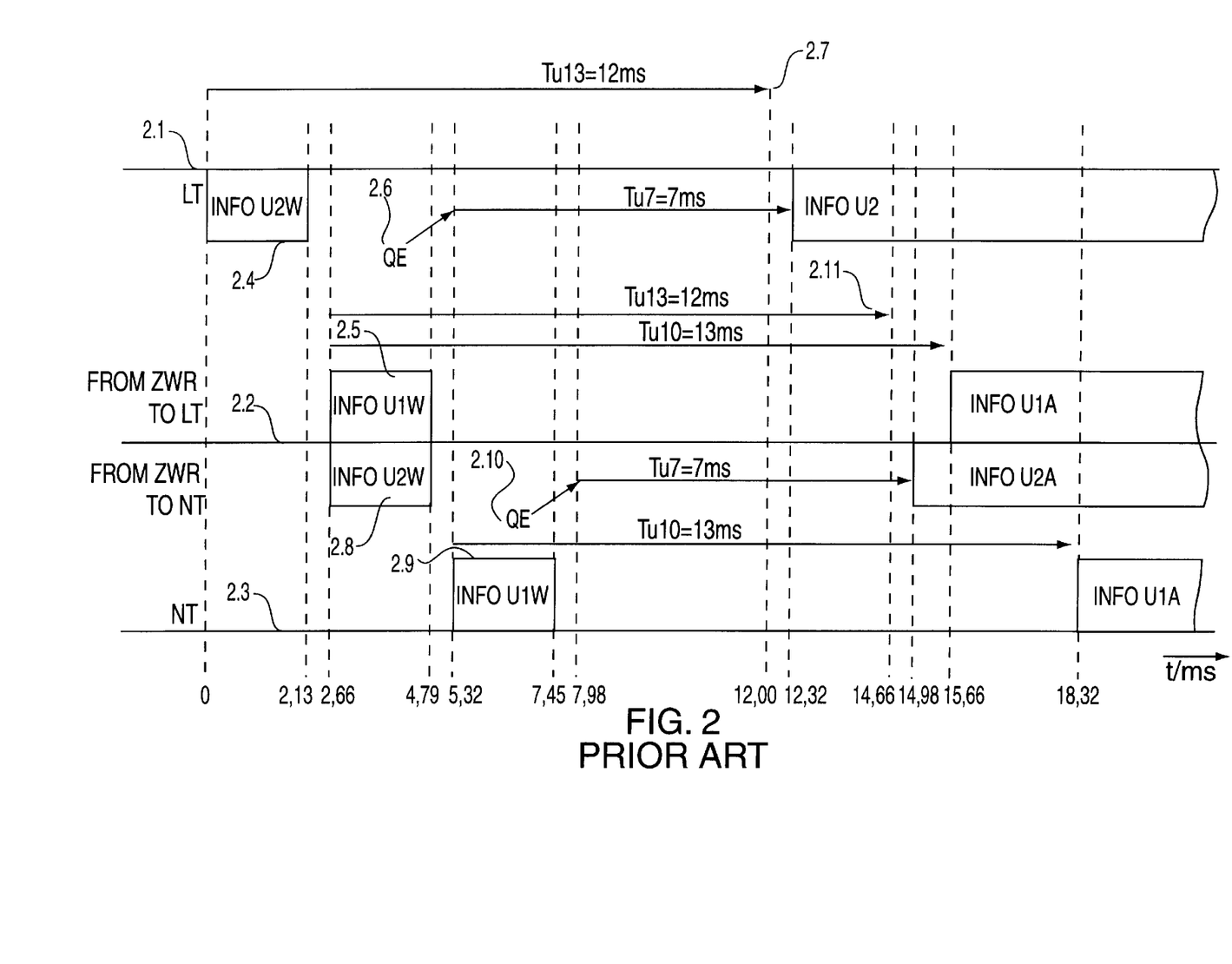
FIG. 2 shows the standard performance of the wake-up procedure for an incoming call.

This is achieved according to the invention for an incoming call for a radio subscriber (activation by the telephone communication) by delaying the INFO U2W signals. The starting point is the standard execution of the wake-up procedure of the $U_{KO}$ section by the intermediate generator (see FIG. 2). As part of this procedure, after a PH-ACTIVATE REQUEST, the line termination (LT)2.1 emits the wake-up signal INFO U2W 2.4 to the intermediate generator 2.2, whereupon acknowledgment is given by the intermediate generator with INFO U1W 2.5. In the standard timing, 5.31 ms after the emission of 2.4 starts, the acknowledgment QE 2.6 is given. QE 2.6 is recognized as being in good order if it takes place before the end of the wake-up repeat time Tu13=12 ms 2.7, which was started at the beginning of the emission of 2.4 in the line terminal LT. This signifies that QB2.6 may be delayed by no more than 6.68 ms from the standard timing (waiting period) without any disturbance of the wake-up procedure. The same conditions as for the $U_{KO}$ section LT-ZWR apply to the $U_{KO}$ section ZWR-NT 2.3. Parallel to the emission of the acknowledgment 2.5 to the LT the ZWR transmits to the NT the activation call INFO U2W 2.8 and simultaneously starts the wake-up repeat time Tu13=12 ms 2.11. Thus the acknowledgment INFO UIW 2.9 of the NT and Q 2.10 in the ZWR can be delayed (waiting period) by a maximum of 6.68 ms from the standard timing also on the second $U_{KO}$ section ZWR-NT without any disturbance of the activation of the $U_{KO}$ section. The two waiting periods can be used together or independently of one another.

Figure 3:
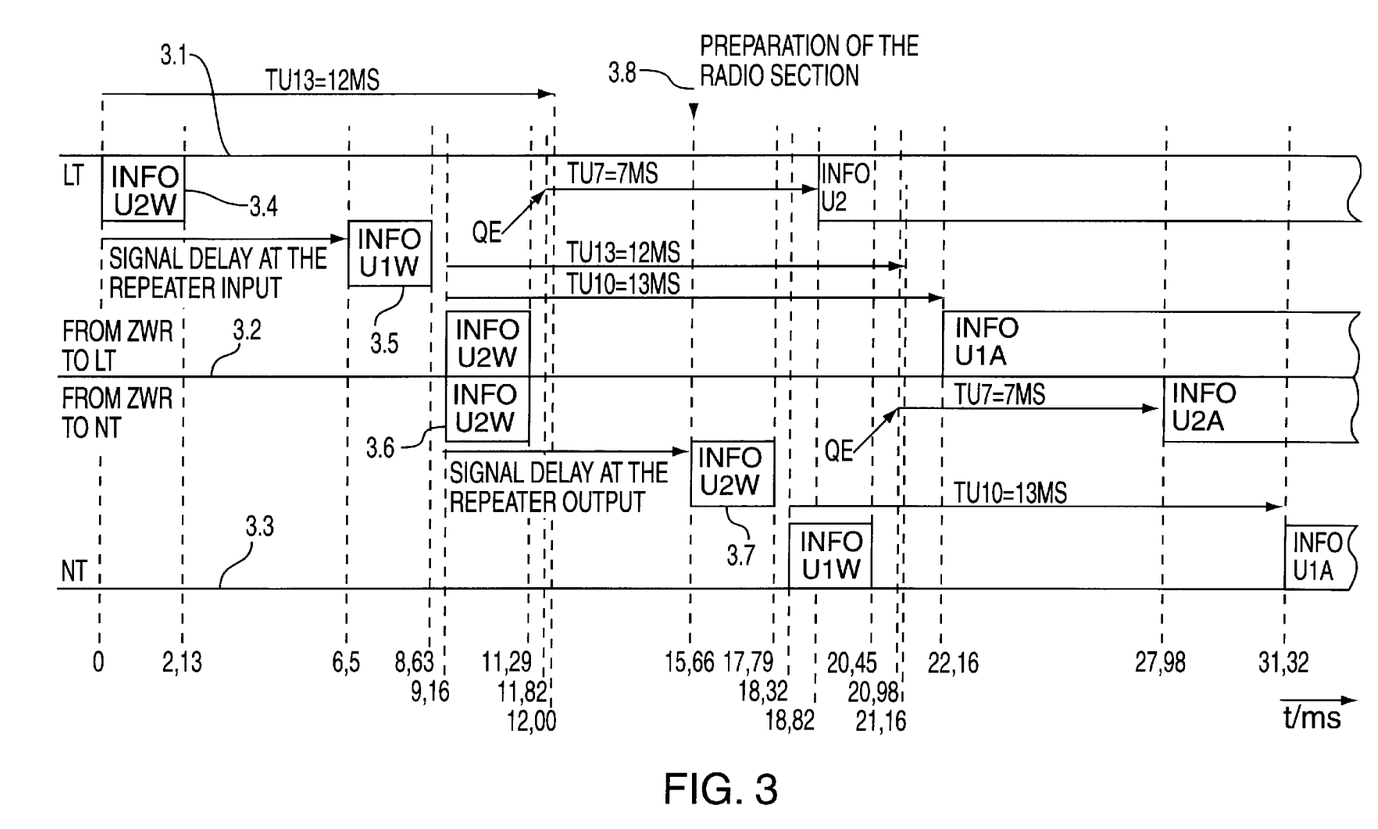
FIG. 3 shows the modified performance of the wake-up procedure for all incoming call.

Using the waiting periods of the wake-up procedure results in the performance of the $U_{KO}$ section corresponding to FIG. 3. The INFO U2W 3.4 emitted from the LT 3.1 (see FIG. 3) is transferred by a system of its own with a delay to the LT input of the ZWR 3.2, and the INFO U2W 3.6 generated by the ZWR is sent with delay by a system of its own to the second $U_{KO}$ section. At the moment 3.8 of the beginning of this sending the radio communication must be shut off so that 3.6 can be transferred to the NT 3.3 and the activation of the $U_{KO}$ section can be continued properly.

Figure 4:
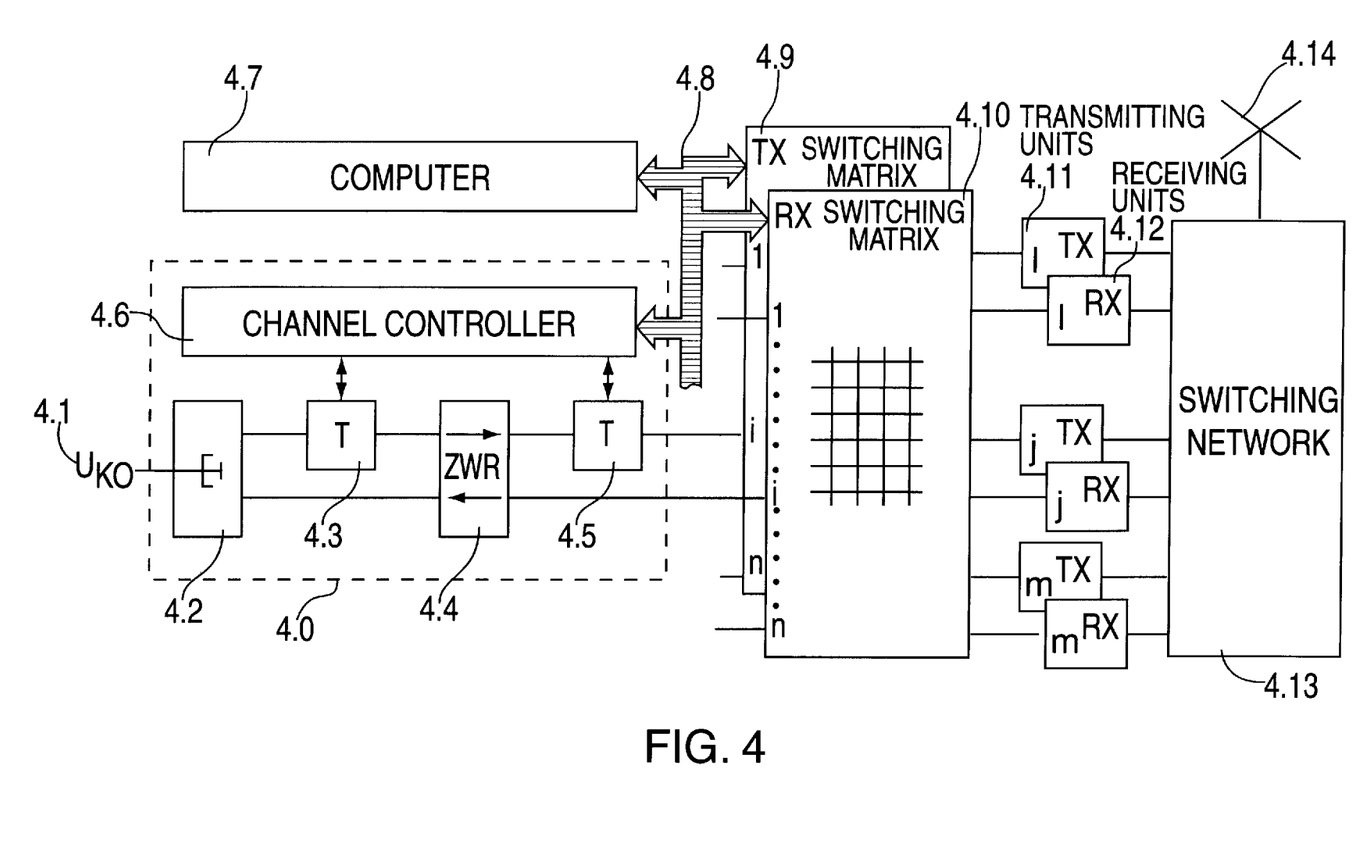
FIG. 4 shows the flow diagram of the base station of an ISDN-DAL system.

These functions are performed in the base station by channel units 4.0 (see FIG. 4), which are associated with each $U_{KO}$ subscriber connection 4. 1. The incoming line signal is divided in a termination hybrid 4.2 into a downstream and an upstream. Into the downstream line a delay system 4.3 and 4.5 is inserted at the input and output of the ZWR 4.4 and are controlled by the channel controller 4.6. When the $U_{KO}$ section is in the deactivated state the delay systems 4.3 and 4.5 constitute an interruption of the line. A wake-up signal entering on the up side of the delay system 4.3 is recognized by the channel controller 4.6, which thereupon starts the process of the radio communication, and after the maximum permissible delay or after the radio communication is complete it feeds the same wake-up signal on the down side of the delay system and then cancels the division of the line (on this, see also FIG. 3 and the description corresponding to FIG. 3). If after the maximum allowable delay time of the delay system 4.3 the radio communication is not yet completed, the same process can be repeated at the delay system 4.5. The base station is completed, in a manner known in mobile telephone technology, by a radio communication computer 4.7 which controls all channel units 4.0 and the switching matrices of the transmission direction 4.9 and reception direction 4.10 through a central bus 4.8. Transmission units 4.11 and receiving units 4.12, which operate through a switching network 4.13 on a common antenna 4.14, are switched to the switching matrix units 4.12.

Figure 5:
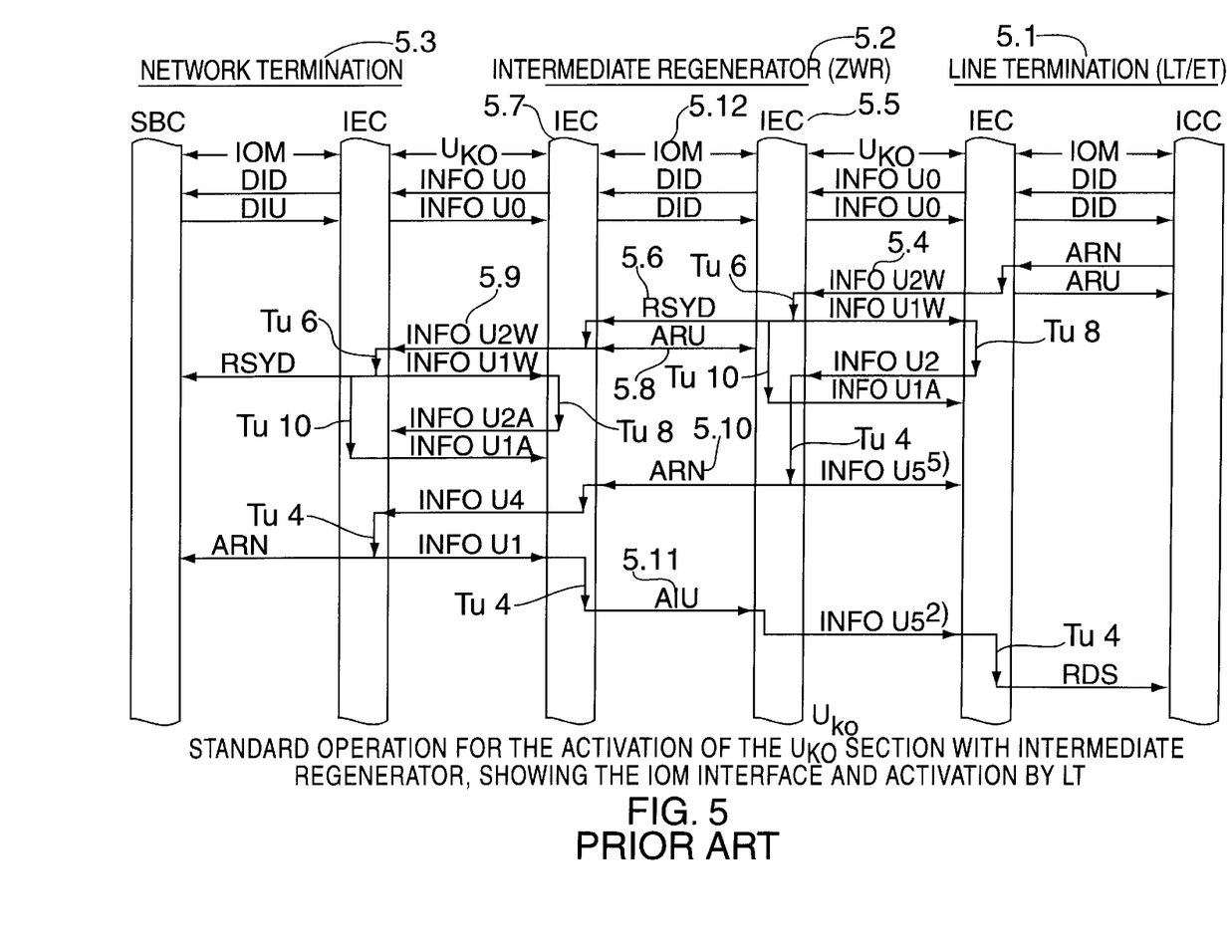
FIG. 5 shows the standard wake-up procedure for an incoming call including display of the IOM interface.

According to the invention, in another variant embodiment, when a call arrives for a radio subscriber (activation by the telephone communication) the time needed for the radio connection is obtained through the delayed transfer of the activation request between the LT-side input circuit and subscriber-side output circuit of the ZWR. For this purpose, one must first consider the standard execution of the activation of the $U_{KO}$ section with ZWR as represented in FIG. 5. Comprised in this execution is that, after entry of an INFO U2W 5.4 from the line termination 5.1 the input circuit 5.5 of the ZWR 5.2 sends the Info RSYD 5.6 to the output circuit 5.7. The output circuit 5.7 acknowledges with the Info ARU 5.8 and by emitting Info U2W 5.9 initiates the activation of the second section of ZWR 5.1 to the NT 5.3. The exchange of the signals ARN 5.10 and AIU 5.11 completes the activation through the IOM interface of ZWR 5.12.

Figure 6:
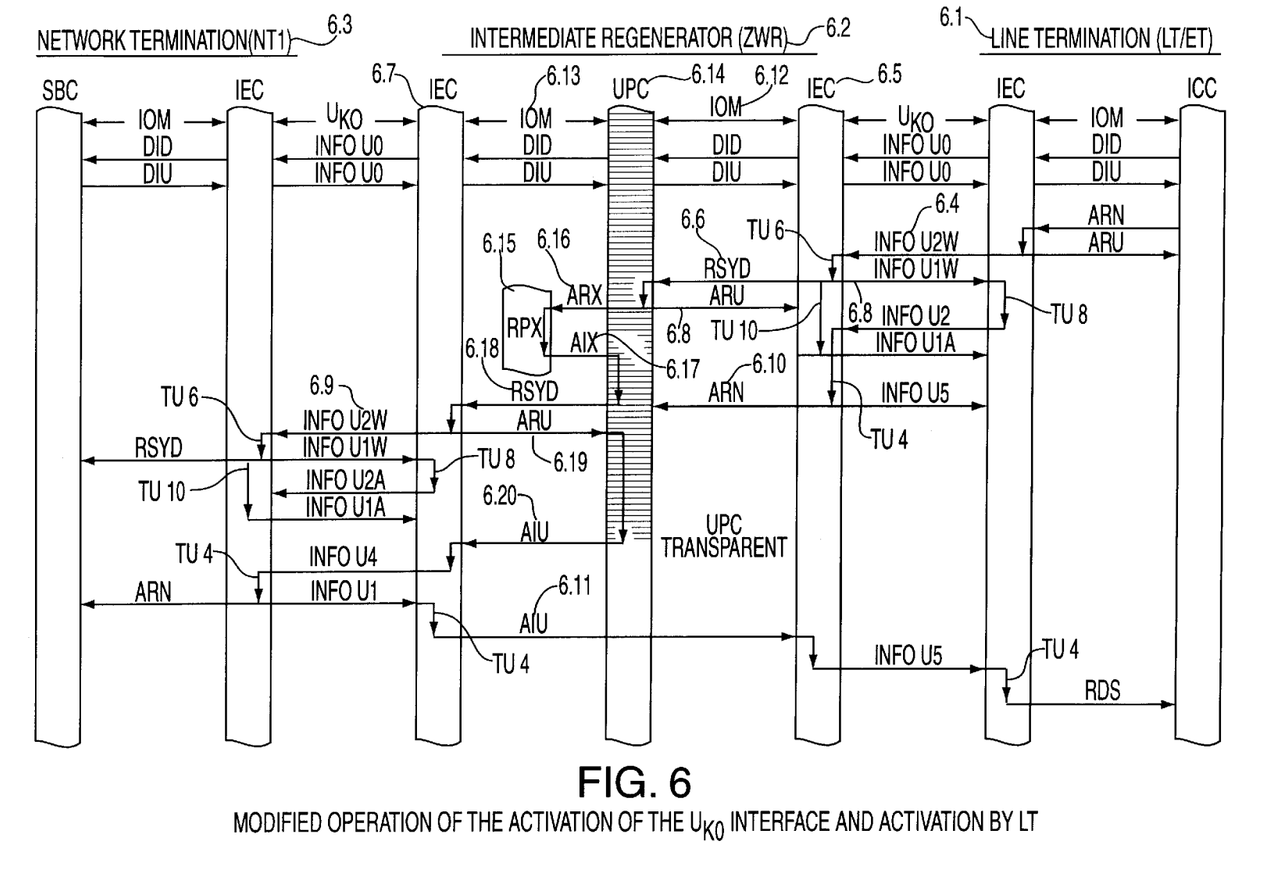
FIG. 6 shows the modified wake-up procedure upon an incoming call including display of the IOM interface.

For the embodiment of the invention, an interface processor UPC 6.14 is inserted into the IOM interface as represented in FIG. 6 and the IOM interface is thus divided into two sections 6.12 and 6.13. After receiving an INFO U2W 6.4 from the line termination 6.1, the input circuit of the ZWR 6.2 emits the Info RSYD 6.6, which is received by the UPC. The UPC 6.14 acknowledges with the signal ARU 6.8 and transmits the activation instruction ARX 6.16 to the radio switching system RPX 6.15. After the radio connection is made to the desired subscriber radio receiver the RPX 6.15 sends the activation acknowledgement AIX 6.17 is sent to the UPC. Not until then does the UPC 6.14 send the signal RSYD 6.18 delayed to the output circuit 6.7 of ZWR 6.2. The output circuit 6.7 of ZWR 6.2 acknowledges with the info ARU 6.19 and now, by issuing the INFO U2W 6.9, it activates the second section of the ZWR 6.2 to NT 6.3.

This procedure runs over the already activated radio connection to the desired subscriber terminal. After the Info ARU 6.19 is received, UPC 6.14 also sends the Info ARN 6.20 delayed to the output circuit 6.7 of the ZWR 6.2. From this moment UPC 6.14 switches the connection between input circuit 6.5 and output circuit 6.7 of ZWR 6.2 to transparent and all subsequent signals are transmitted without variation or delay.

Figure 7:
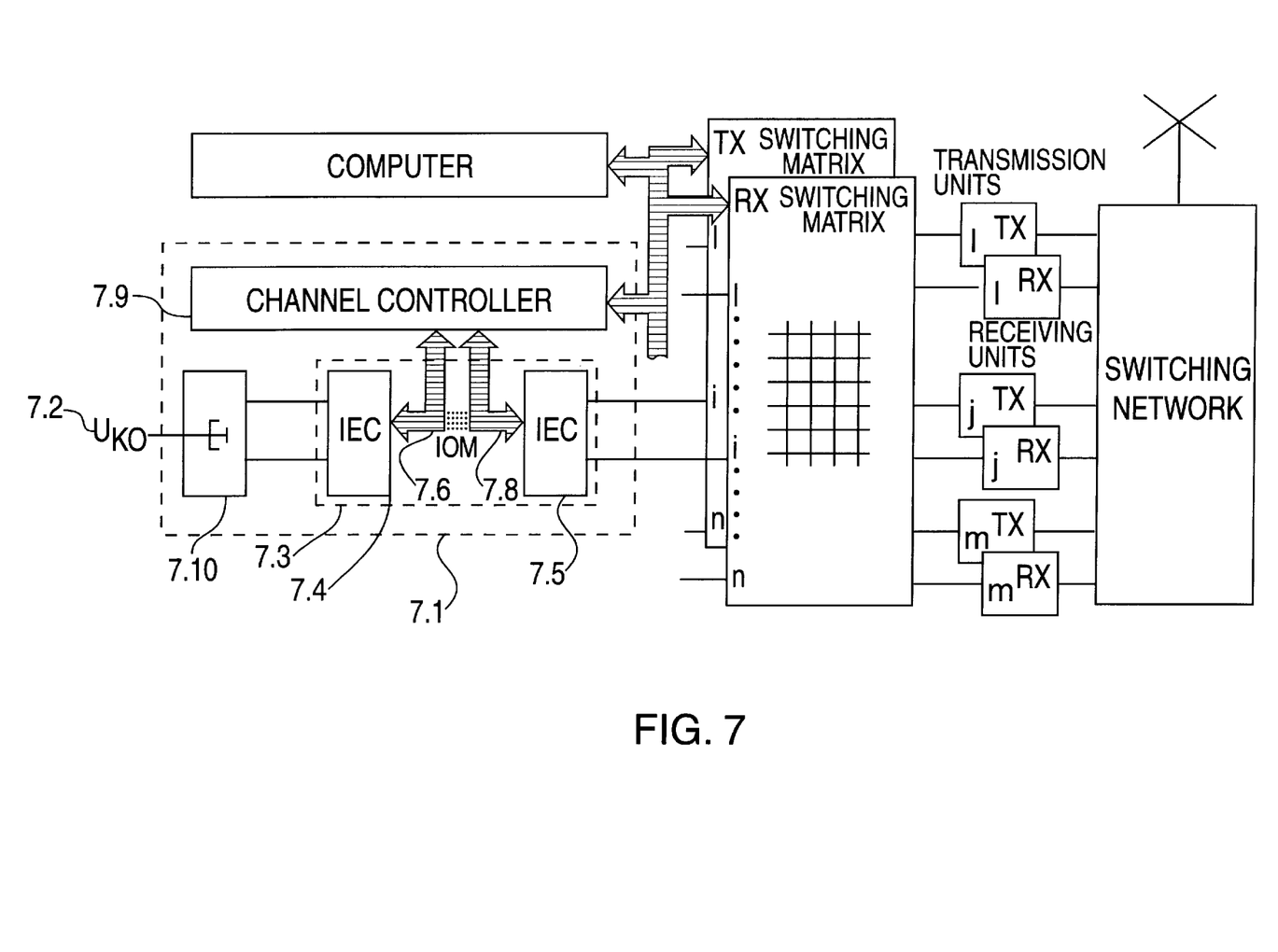
FIG. 7 shows the circuit diagram of the base station of an ISDN-DAL system upon intervention into the IOM interface according to FIG. 6.

These variants of the invention are likewise made in the base station by channel components 7.1 (see FIG. 7), which are associated with each $U_{KO}$ subscriber connection 7.2. It is an important feature that in ZWR 7.3 the IOM bus between the circuits IEC 7.4 and IEC 7.5 is entirely or partially interrupted and bus portion 7.6 of IEC 7.4 as well as bus portion 7.8 of IEC 7.5 are connected each to the channel controller/RPX 7.9. The line signal arriving from the LT is divided in a termination hybrid 7.10 into downstream and upstream and the latter are connected directly to IEC 7.4. When an activation request of the LT (INFO U2W) is present, the activation request issued from the IEC 7.4 through the IOM interface 7.6 is recognized by the channel controller /RPX 7.9 which thereupon starts the process of radio switching (see also FIG. 6 and the description relating thereto). After successful radio switching, the channel controller transfers the activation request through the IOM interface 7.8 for the second $U_{KO}$ section to the IEC 7.5. The base station is completed in a manner known in mobile telephone technology and identical to the representation in FIG. 4 and corresponding description.

According to the invention, in the case of an outgoing call by a radio subscriber (activation request by terminal equipment) the time for the radio switching is achieved by the delay of the signal INFO S1. The starting point is the standard execution of the wake-up procedure of the $S_0$ section which sets no time limit for the emission of the acknowledgement INFO S2 by the NT after detection of the INFO S1 (except for the total supervision time Ts1=30 . . . 35 s for completion of the activation in the TE with PH-ACTIVATE INDICATION).

Figure 8:
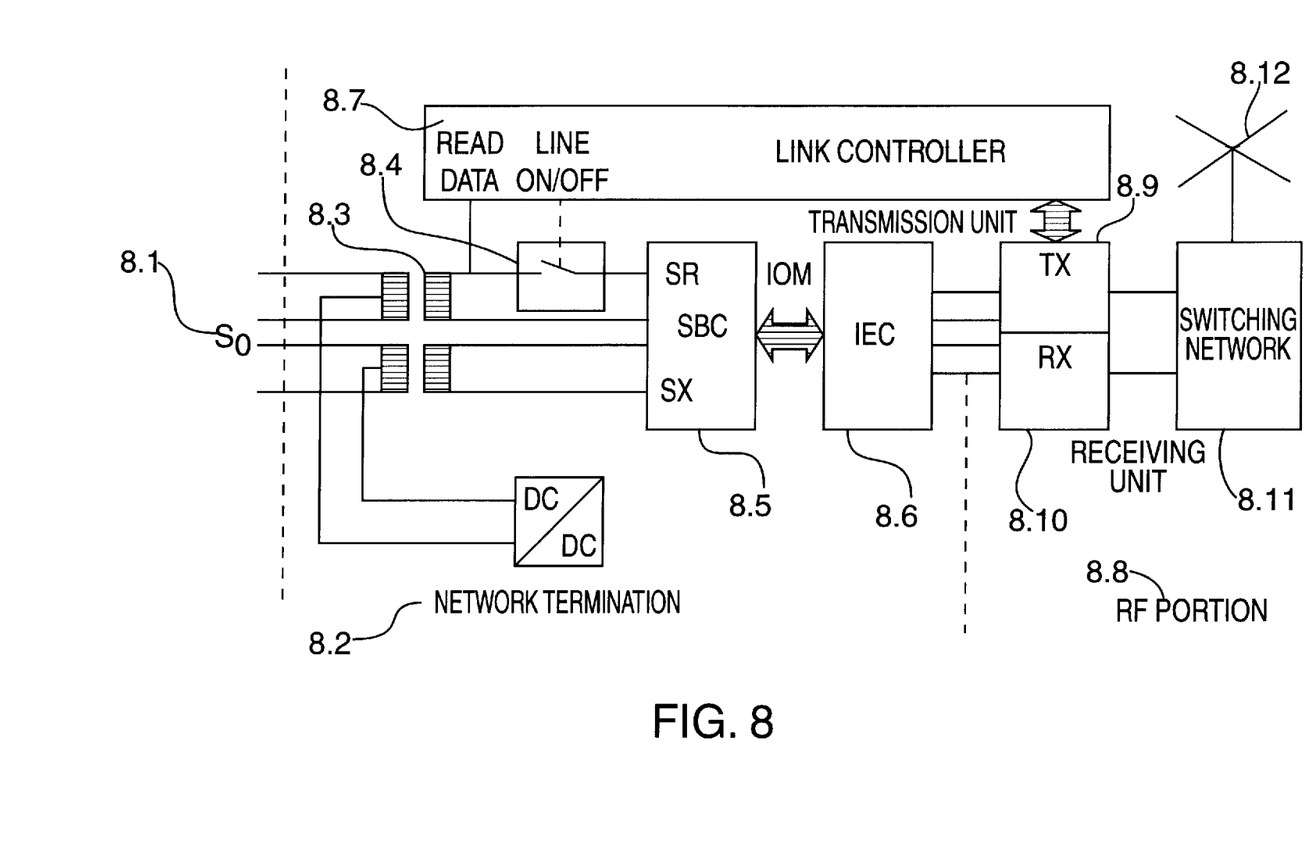
FIG. 8 shows the circuit diagram of a subscriber terminal of an ISDN-DAL system upon intervention into the $S_0$ interface.

The implementation takes place in the subscriber's radio apparatus (see FIG. 8), since in the NT 8.2 between the $S_0$ transformer 8.3 and circuit SBC (SBCX) 8.5 in the upstream branch a switch element 8.4 is disposed which can be operated by the link controller 8.7 through a control line. The link controller 8.7 is connected to the upstream branch between $S_0$ transformer 8.3 and switch means 8.4. The switch means 8.4 in the deactivated state of the $S_0$ section constitutes an interruption of the conduction train. A signal INFO S1 entering on the downside of the switch means 8.4 is detected by the link controller 8.7 which then starts the process of radio switching and, after the radio switching is finished, switches the switch means 8.4 to "ON" so that INFO S1 is applied to the NT and initiates the activation of the ISDN subscriber connection.

Figure 9:
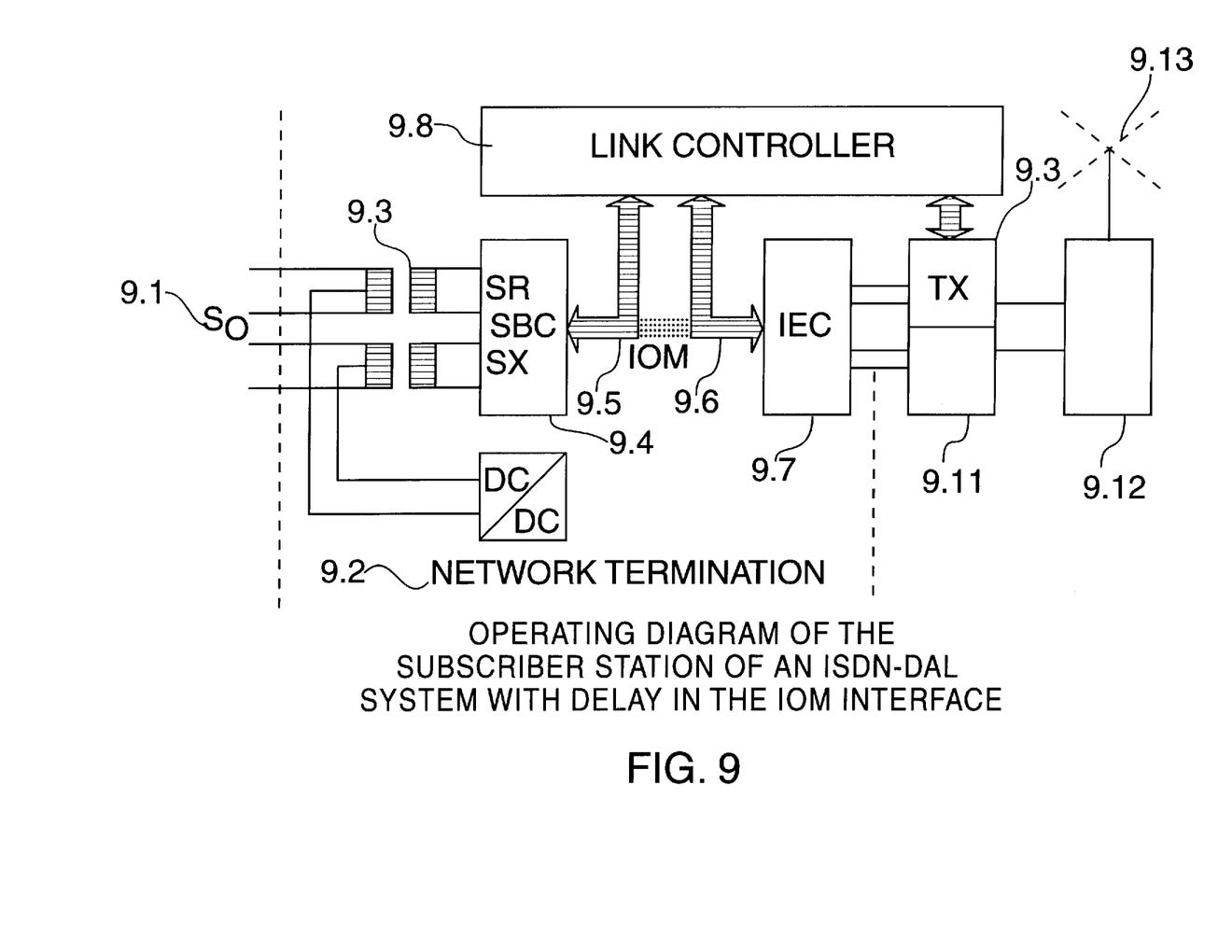
FIG. 9 shows the circuit diagram of a subscriber terminal of an ISDN-DAL system upon intervention into the IOM interface.

In another variant of the invention, the same problem is solved in the subscriber radio terminal as well (see FIG. 9). An important feature is that in NT 9.2 the IOM bus between the circuits SBC (SBCX) 9.4 and IEC 9.7 is wholly or partially interrupted and the bus portion 9.5 of the SBC 9.4 as well as the bus portion IEC 9.7 are connected each to the link controller 9.8. The $S_0$ signal 9.1 is switched through an $S_0$ transformer 9.3 to the circuit SBC (SBCX) 9.4 of NT 9.2. When an activation request from a TE (INFO S1) is present, the activation request emitted by the SBC (SBCX) 9.4 through the IOM interface 9.5 is detected by the link controller 9.8 which then starts the process of radio switching. After successful radio switching the activation request is transferred to the circuit IEC 9.7 through the IOM interface 9.6, thereby starting the activation of the ISDN subscriber connection.

Figure 10:
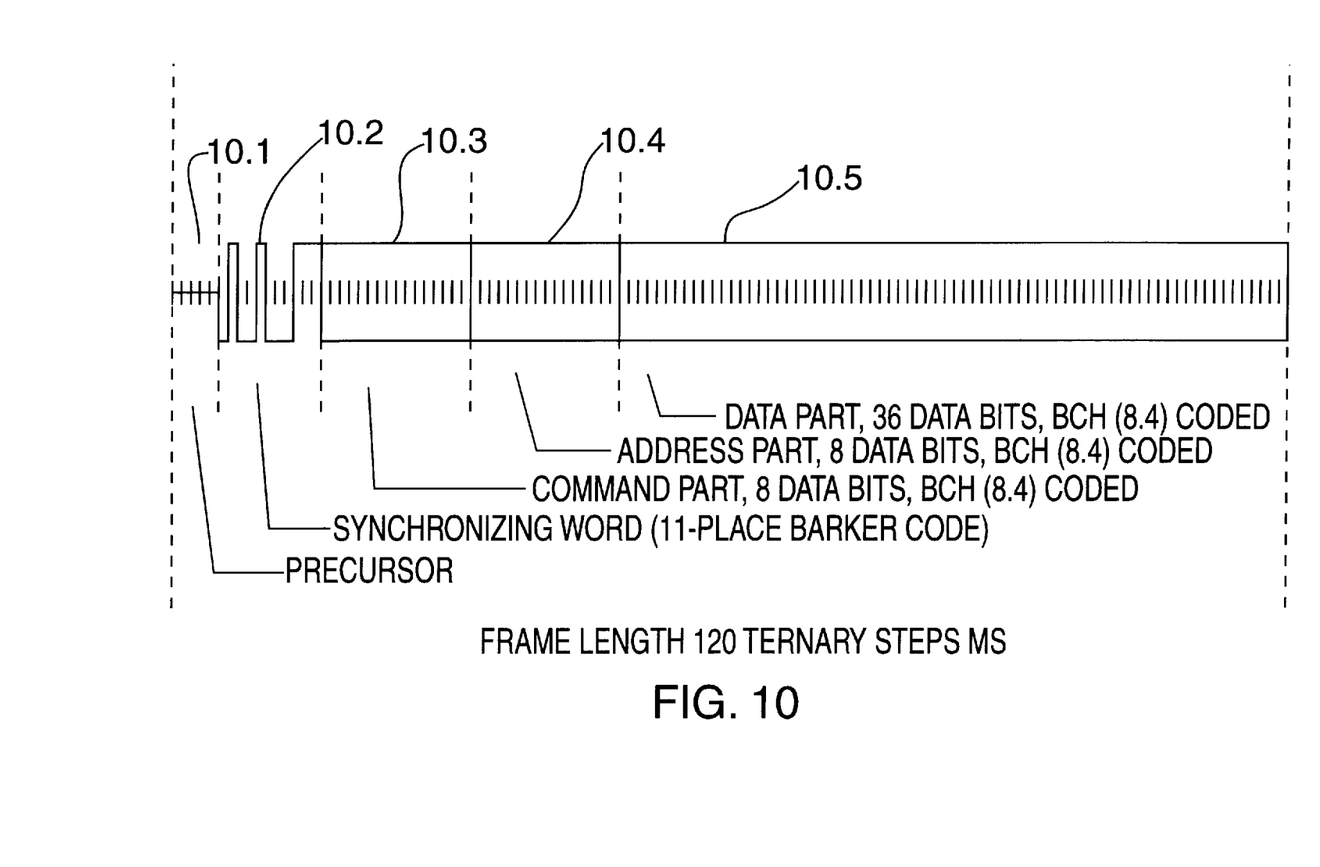
FIG. 10 shows the data frame for radio communication in an ISDN-DAL system.

In order to achieve the most effective possible utilization of the available transmission bandwidth, an independent radio channel for operation, organization and control purposes is dispensed with the inactive subscriber radio terminals position themselves automatically in one of the free information channels and a uniform distribution of the subscriber radio terminals to the free information channels is assured by the fact that, prior to any channel change, a random whole number n (e.g., $1 \leq n \leq 16$) is determined which indicates the ordinal number of the free channel that is to be used in cyclical scanning, and that channel changes are allocated automatically at time intervals upon instruction from the radio switching system of the base station (BS), or whether the channel actually in use is assigned to another subscriber radio terminal for active use. All of the commands and information required for this purpose are transmitted in the free radio channels. To reduce complications, data rates, block lengths and synchronization words are chosen to be identical with the particular U interface standard. To make it possible for a radio channel to be recognized as free in the subscriber terminal, the synchronizing words are inserted into the transmission in reverse order (beginning and end inverted), so that it can be clearly distinguished whether radio switching or ISDN transmission is involved. A data frame corresponding to these specifications is represented in FIG. 10. The data frame begins with 5 ternary "0" steps as leader. This is followed by 11 ternary steps of synchronizing word 10.2. An 11-place Barker code is used as the synchronizing word which is transmitted from the BS to the radio subscriber in the form of:

−+−−+−−−+++.

In the direction away from the subscriber, the transmission is in the form:

+++−−−+−−+−

In ISDN transmission the bar codes are inserted backwards into the data streams. The polarity in this case is of no importance, since the receiving circuits contain an automatic polarity detector. 16 ternary steps follow, the command part 10.3, since in BCH (8.4) coding 8 data bits can contain 256 commands. Another 16 ternary steps, address part 10.4, follow which in BCH (8.4) coding can contain 8 data bits equal to 256 addresses. The remaining 72 ternary steps 10.5 are used as the data part and on the same basis as in 10.3 and 104 can transmit 36 data bits. As an example, free/busy messages for 36 channels can be contained in it as one-bit information.

From the technical radio communication point of view, it is practical to distribute inactive subscriber radio terminals evenly to the free radio channels, in order to have as few switching operations as possible in a desired connection set-up and reduce the probability of a random signal hazard. This problem is solved in that the subscriber radio terminal contain a random generator which before any channel change determines an evenly distributed integer random number, which can be between 1 and 16, for example, depending on the size of the system, and which tells the number of the free channel that is to be used in cyclical scanning.

The channel changes are automatically performed by the subscriber radio terminal at variable time intervals, also on instructions from the radio switching system, or if the channel actually in use is assigned to another subscriber terminal for active use.

When a call arrives the radio switching system allocates a free radio channel to the subscriber by transmitting an addressed inquiry into all free radio channels. This is necessary if there is no a priori knowledge in the radio switching system regarding the radio channel occupied at that time by the subscriber radio terminal.

If this inquiry is acknowledged by the subscriber radio terminal, an acknowledgement is sent, which causes the radio switching system to allocate to the subscriber the radio channel currently used by the subscriber radio terminal, and to set up a connection to the called subscriber, so that there will be no further losses of time due to channel changing etc. It is only on account of time-parallel processes or signal hazards that departures from this procedure can occur, in which case a disentanglement is performed in that, after a radio channel has been allocated to a specific subscriber radio terminal, all other subscriber radio terminal leave this radio channel.

Inquiries and acknowledgements are controlled centrally by the radio switching system on the master-slave principle.

When a subscriber tries to make a call (outgoing call), a request to that effect is performed by the subscriber's radio apparatus in the radio channel that is free at that moment. If this call is successfully received, this radio channel, releases the base station to the subscriber radio terminal for active ISDN information transmittal. The procedure and restrictions of this procedure are as described above. To obtain a time-defined reaction of the subscriber terminal, the radio switching system emits free calls to which answer can be made by a call attempt from a subscriber terminal. If a subscriber terminal is not assigned the radio channel after the call attempt is made an evenly distributed random integer number is generated which indicates the ordinal number of the following free call of the radio switching system that is to be used for another transmission of a call attempt, and accordingly repeats the call attempt.

This process assures that, on the basis of a possible signal hazard due to simultaneous call attempts by several subscribers a disentanglement of the individual subscriber calls will be made.

If an overlapping of requirements regarding incoming and outgoing traffic for two different subscriber terminals occurs within a radio channel, this does not result in traffic hazards, since in this case another, free radio channel is allocated to one of the subscriber terminals in question. The procedure of changeover to another free channel can result in losses, especially in the case of the occurrence of relatively high traffic and relatively great numbers of channels, due to the fact that the subscriber radio terminals require an appreciable amount of time to search for free radio channels if the search procedure involves the scanning of all of the radio channels. To forestall this, the radio switching system is constantly transmitting updated information on free channels. Consequently the subscriber radio terminals are able to determine what the new channel is without a search, thus reducing the technical communication losses.

The following abbreviations are terms from user documentation, type names and registered trademarks of the Siemens company:

| | |
|---|---|
| IOM | ISDN Oriented Modular Interface |
| IOM-1 | ISDN Oriented Modular Interface Version 1 |
| IOM-2 | ISDN Oriented Modular Interface Version 2 |

-continued

| | |
|---|---|
| RSYD | Resynchronizing Indication Downstream |
| ARU | Activation Request Upstream |
| ARN | Activation Request no Loop |
| AIU | Activation Indication Upstream |
| IEC | ISDN Echocancellation Circuit |
| IEC-T | ISDN Echocancellation Circuit |
| IEC-TD | ISDN Echocancellation Circuit/Digital Circuit |
| IBC-TA | ISDN Echocancellation Circuit/Analog Circuit |
| SBC | S-Bus Interface Circuit |
| SBCX | S-Bus Interface Circuit, Extended |

INDUSTRIAL UTILITY

The invention is industrially useful in the telecommunication industry.

We claim:

1. A local ISDN transmission system comprising a central base station and a plurality of subscriber radio terminals, wherein the base station has a plurality of communication channels and is connectable to subscriber ports of one of a local switching center, a store-and-forward center and a private branch exchange to provide subscribers with access to a public ISDN telephone system through an $S_0$ wireless transmission interface and is responsive to an activation request from a subscriber radio terminal for opening any available and free communication channel for a communication, wherein the plurality of subscriber terminals is greater than the plurality of communication channels and the $S_0$ interface is an unrestricted interface and transmits a net bit rate of the subscriber terminal unrestricted through the communication channel, wherein an intermediate generator in the base station and in each subscriber terminal dividing an ISDN two-wire subscriber connection line between a line termination section and a network termination section communicating by radio transmission and wherein the intermediate generator upon the occurrence of an activation request by a subscriber terminal allocates a communication channel within waiting and monitoring periods for the activation of the ISDN two-wire subscriber connecting line and wherein a delay system delays the activation request by a delay period sufficient to switch the allocated communication channel and activate a radio system of the subscriber terminal.

2. The system according to claim 1, wherein the system delaying the activation request comprises a delay circuit in at least one of the line termination and network termination sections.

3. The system according to claim 1, wherein the delay system is inserted into an interface between an input circuit and an output circuit of the intermediate generator in the subscriber terminal to delay the transfer of the activation request to the output circuit.

4. The system according to claim 1, wherein the delay system is present in the subscriber radio terminal at a $S_0$ connection of the network termination to delay the activation request of a connected terminal.

5. The system according to claim 1, wherein the delay system is inserted into an interface between an input circuit in the subscriber terminal and an output circuit of the network termination which delays the transfer of the activation request of a connected terminal.

6. The system according to claim 1, wherein after a delayed transmission of the activation request, a transparent connection is made.

7. The system according to claim 1, wherein distributed switching is performed in all free channels and inactive subscriber terminals are automatically positioned in one of the free information channels and a uniform distribution of the subscriber terminals to the free information channels is assured by the fact that, prior to any channel change, a random whole number n is determined which indicates the ordinal number of the free channel that is to be used in cyclical scanning, and that channel changes are allocated automatically at time intervals upon instruction from the base station.

8. The system according to claim 7, wherein the base station, upon an incoming call for a subscriber terminal, issues an addressed query to all free channels and allocates to the subscriber terminal, on the basis of an acknowledgement, the information channel in which it is currently located.

9. The system according to claim 7, wherein the base station sends free call commands into the free channels if no other switching and signaling procedures are to be performed, and when a subscriber terminal issues an activation request, the base station allocates to the subscriber terminal, at its request, the information channel in which it is currently located, for active use.

10. The system according to claim 9, wherein the subscriber terminal, after a call request which is not acknowledged, determines a random integer n which indicates an ordinal number of a following free call that is to be used for a repeated transmission of an activation request.

11. The system according to claim 9, wherein in case of the simultaneous occurrence of incoming and outgoing activation requests for two subscriber terminals in the same information channel, or the simultaneous occurrence of outgoing activation request from two subscriber terminals in the same information channel, another free information channel is allocated to one of the subscriber terminals for active use.

12. The system according to claim 7, for data transmission, wherein a synchronizing word in transmissions for radio switching is inserted into the transmission in reverse.

13. The system according to claim 7, for data transmission, wherein for the purpose of radio switching in a data part of a data frame, updated information is transmitted through free channels.

* * * * *